(12) United States Patent
Rothberg

(10) Patent No.: US 7,136,244 B1
(45) Date of Patent: Nov. 14, 2006

(54) DISK DRIVE EMPLOYING DATA AVERAGING TECHNIQUES DURING RETRY OPERATIONS TO FACILITATE DATA RECOVERY

(75) Inventor: Michael S. Rothberg, Foothill Ranch, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 696 days.

(21) Appl. No.: 10/080,784

(22) Filed: Feb. 22, 2002

(51) Int. Cl.
G11B 5/02 (2006.01)
G11B 27/36 (2006.01)

(52) U.S. Cl. .................................. 360/53; 360/31
(58) Field of Classification Search .................. 360/63, 360/48, 77.04, 77.08; 714/6, 719, 764
See application file for complete search history.

(56) References Cited

U.S. PATENT DOCUMENTS

| | | | |
|---|---|---|---|
| 5,721,816 A | 2/1998 | Kusbel et al. | |
| 6,009,549 A | 12/1999 | Bliss et al. | |
| 6,188,538 B1 | 2/2001 | Mills et al. | |
| 6,412,088 B1* | 6/2002 | Patapoutian et al. | 714/764 |
| 2003/0147168 A1* | 8/2003 | Galbraith et al. | 360/53 |

* cited by examiner

Primary Examiner—Hoa Thi Nguyen
Assistant Examiner—Mitchell Slavitt
(74) Attorney, Agent, or Firm—Howard H. Sheerin, Esq.

(57) ABSTRACT

The present invention may be regarded as a disk drive comprising a disk having a plurality tracks, each track comprising a plurality of data sectors. If an error occurs while attempting to read one of the data sectors, a retry operation is executed in an attempt to recover the errant data sector. Averaged read data is generated over multiple retry operations, and the averaged read data processed to recover the errant data sector. In one embodiment, the averaged read data comprises an averaged binary sequence detected over multiple retry operations. In another embodiment, the averaged read data comprises averaged read signal sample values generated over multiple retry operations.

20 Claims, 8 Drawing Sheets

DISK DRIVE EMPLOYING DATA AVERAGING TECHNIQUES DURING RETRY OPERATIONS TO FACILITATE DATA RECOVERY

BACKGROUND OF THE INVENTION

1. Field of the Invention

The present invention relates to disk drives for computer systems. More particularly, the present invention relates to a disk drive employing data averaging techniques during retry operations to facilitate data recovery.

2. Description of the Prior Art

Disk drives typically employ an error recovery procedure for recovering an errant data sector when an error occurs during a read operation. If the anomaly which caused the read error is transient, the data sector may be successfully recovered by rereading the data sector during a retry operation. Otherwise if the anomaly is static, the data sector may be recovered by varying selected parameters in the disk drive during the retry operation. For example, U.S. Pat. No. 6,188,538 discloses a disk drive which induces an offset into the servo tracking algorithm during the retry operation in order to improve the likelihood of recovering an errant data sector. In another example, U.S. Pat. No. 5,721,816 discloses a disk drive which adapts parameters of a read channel, such as equalizer coefficients, during retry operations. In yet another example, U.S. Pat. No. 6,009,549 discloses a disk drive comprising a raw samples buffer for buffering the samples of the read signal in memory. During retry operations, the read signal samples buffered in memory are processed in multiple passes while adjusting various read channel parameters which overcomes the rotational latency of the disk. However, further enhancing the retry operation improves the likelihood of recovering an errant data sector.

There is, therefore, a need to improve the retry operation of a disk drive in order to further improve the likelihood of recovering errant data sectors.

SUMMARY OF THE INVENTION

The present invention may be regarded as a disk drive comprising a disk having a plurality tracks, each track comprising a plurality of data sectors. A head is actuated radially over the disk, the head for generating a read signal while reading data from at least one of the data sectors. A buffer buffers read data associated with the read signal. A disk controller processes a read command received from a host computer by positioning the head over a selected data sector to generate a first read signal and storing in the buffer first read data associated with the first read signal. If a read error occurs, the disk controller repositions the head over the selected data sector to generate a second read signal. Second read data associated with the second read signal is averaged with the first read data stored in the buffer to generate averaged read data. The average read data is stored in the buffer and processed to recover the selected data sector.

In one embodiment, the read data comprises binary bits detected from the read signal such that the averaged read data comprises averaged binary bits. In one embodiment, the disk controller implements an error correction code (ECC) for detecting and correcting errors in the averaged binary bits. In one embodiment, the averaged binary bits are grouped into ECC symbols, a reliability metric is generated for each ECC symbol in response to a reliability derived from averaging the binary bits, and the disk controller processes the reliability metrics to augment the ECC. In one embodiment, at least one erasure pointer is generated from the reliability metrics, and the disk controller processes the erasure pointer to increase the number of correctable ECC symbols.

In one embodiment, the read data comprises read signal sample values generated by sampling the read signal such that the averaged read data comprises averaged read signal sample values. In one embodiment, the disk drive further comprises a read channel for detecting an estimated data sequence from the averaged read signal sample values. In one embodiment, the read channel comprises an equalizer filter for filtering the averaged read signal sample values to generated equalized read signal sample values, and a sequence detector for detecting the estimated data sequence from the equalized read signal sample values.

In one embodiment, the disk controller adjusts at least one parameter of the disk drive prior to rereading the selected data sector. In one embodiment, the disk controller adjusts a read channel parameter. In one embodiment, the disk controller adjusts a servo control parameter. In one embodiment, the disk controller adjusts a tracking offset to at least two different settings wherein for each tracking offset setting the disk controller performs multiple rereads of the selected data sector to generate the averaged read data.

The present invention may also be regarded as a method of recovering an errant data sector in a disk drive. The disk drive comprises a disk having a plurality of data sectors, a head actuated radically over the disk, the head for generating a read signal while reading data from at least one of the data sectors, and a buffer for buffering read data associated with the read signal. The method comprises the steps of receiving a read command from a host computer, positioning the head over a selected data sector to generate a first read signal, and storing in the buffer first read data associated with the first read signal. If a read error occurs, the method further comprises the steps of repositioning the head over the selected data sector to generate a second read signal, averaging second read data associated with the second read signal with the first read data stored in the buffer to generate averaged read data, storing the averaged read data in the buffer, and processing the averaged read data stored in the buffer to recover the selected data sector.

DESCRIPTION OF THE PREFERRED EMBODIMENTS

Figures 1A, 1B:
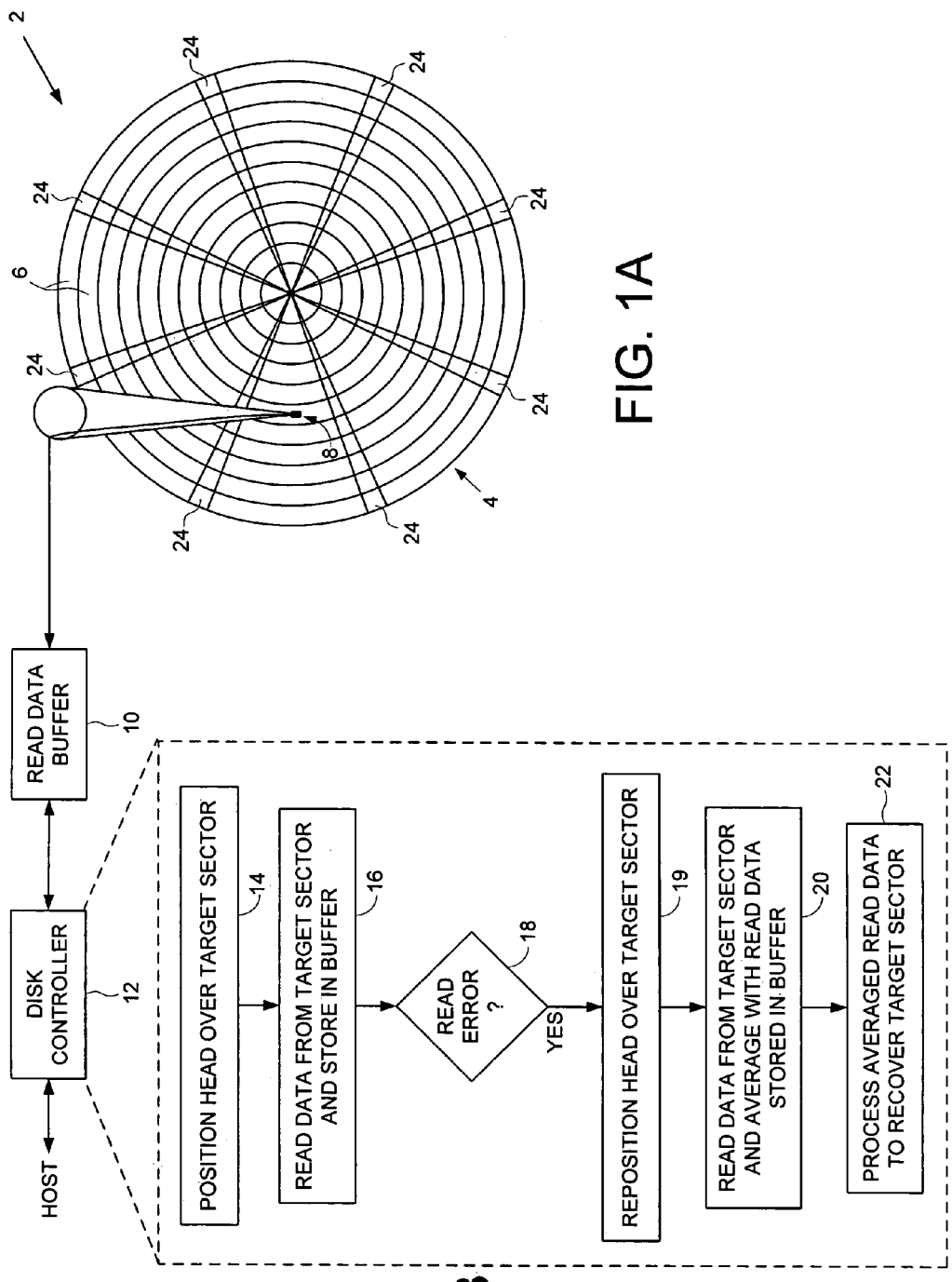
FIG. 1A shows a disk drive according to an embodiment of the present invention comprising a buffer for storing averaged read data during retry operations, and a disk controller for processing the averaged read data stored in the buffer to recover an errant data sector.
FIG. 1B is a flow diagram of the steps executed by the disk controller for performing a read operation, including retry operations during which averaged read data is generated and used to recover an errant data sector.

FIG. 1A shows a disk drive 2 according to an embodiment of the present invention comprising a disk 4 having a plurality of tracks 6, each track comprising a plurality of data sectors. A head 8 is actuated radially over the disk 4, the head 8 for generating a read signal while reading data from at least one of the data sectors. A buffer 10 buffers read data associated with the read signal, and a disk controller 12 processes a read command received from a host computer. As shown in the flow diagram of FIG. 1B, at step 14 the disk controller 12 positions the head 8 over a selected data sector to generate a first read signal and at step 16 stores in the buffer 10 first read data associated with the first read signal. If at step 18 a read error occurs, the disk controller 12 repositions the head over the selected data sector at step 19 to generate a second read signal. At step 20 second read data associated with the second read signal is averaged with the first read data stored in the buffer 10 to generate averaged read data. The average read data is stored in the buffer 10 and processed at step 22 to recover the selected data sector.

Figure 2:
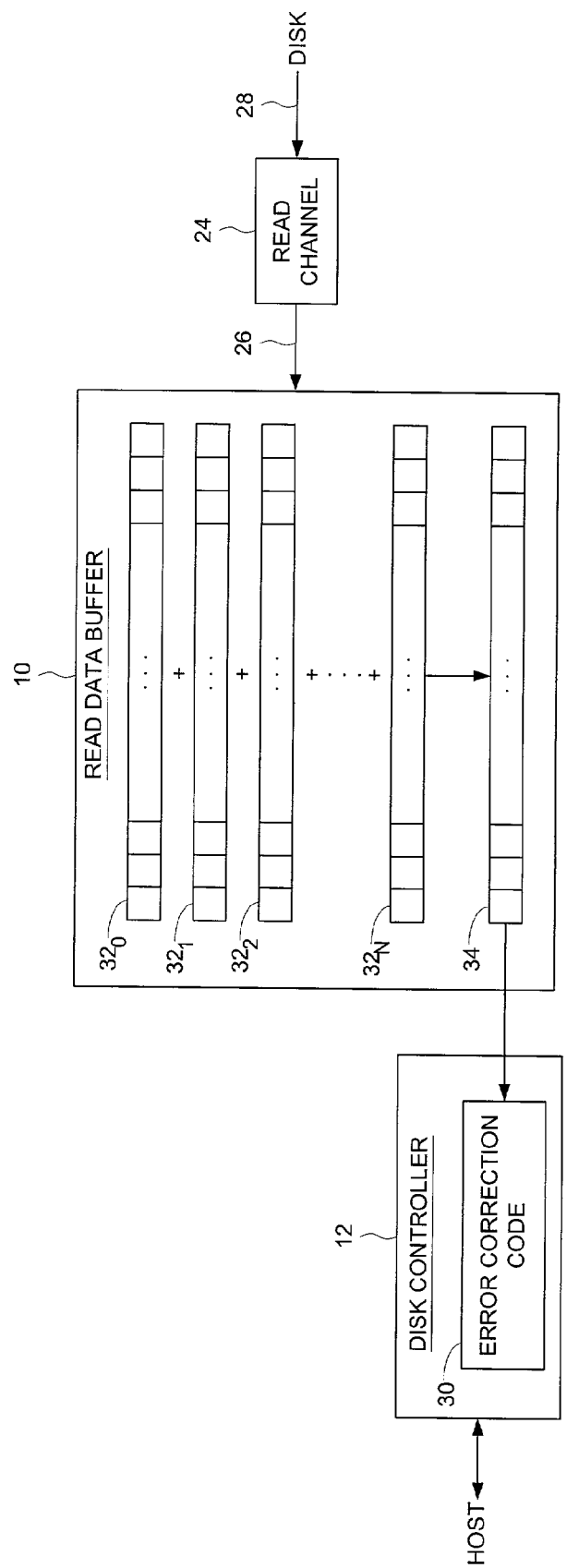
FIG. 2 shows an embodiment of the present invention wherein the averaged read data is generated by averaging an estimated binary sequence detected by a read channel over multiple retry operations.

FIG. 2 illustrates an embodiment of the present invention wherein the disk drive comprises a read channel 24 for detecting an estimated data sequence comprising binary bits 26. The read channel 24 may comprise any suitable circuitry, such as a sampling device for sampling a read signal 28 emanating from the head 8 and detection circuitry for detecting binary bits from the read signal sample values. The binary bits 26 are stored in the buffer 10 and processed by the disk controller 12. The disk controller 12 implements an error correction code 30 for detecting and correcting errors in the binary bits stored in the buffer 10. If during an initial read operation the disk controller 12 is unable to recover a data sector, the data sector is read again during a retry operation. The binary bits 26 detected during the read operation are averaged with the binary bits stored in the buffer 10 to generate averaged binary bits. The disk controller 12 processes the averaged binary bits stored in the buffer 10 in an attempt to recover the data sector. If the data sector is still unrecoverable, another retry operation is executed and the detected binary bits 26 are averaged with the binary bits stored in the buffer 10. This process is reiterated until the data sector is recovered, or the data sector is deemed unrecoverable after a predetermined number of retries.

Figure 3:
FIG. 3 illustrates the averaging of a plurality of the bits in the estimated data sequences detected by the read channel over multiple retry operations.

The averaging operation is illustrated in FIG. 2 as a number of estimated data sequences $32_0$–$32_N$ averaged together to generate the estimated data sequence 34 comprising the averaged data bits. However, any suitable method may be employed to generate the averaged binary bits in the estimated data sequence 34. In one embodiment, the buffer 10 stores a count value for each occurrence of a "1" bit for each binary symbol. The count value for each "1" bit is then divided by the number of retries attempted. If the result of the division is greater or equal to ½, then the averaged binary bit in the estimated data sequence 34 is assigned a "1" bit, otherwise it is assigned a "0" bit. This is illustrated in FIG. 3 which shows an estimated data sequences $32_0$ detected during an initial read operation, and four estimated data sequences $32_1$–$32_4$ detected during four retry operations. The binary bits in the estimated data sequences $32_0$–$32_4$ are averaged together to generate the estimated data sequence 34 comprising averaged binary bits $36_0$–$36_N$. The first averaged binary bit $36_0$ is assigned a "1" bit since there are three "1" bits in the corresponding bit of the estimated data sequences $32_0$–$32_4$, and ⅗ is greater than or equal to ½. The second averaged binary bit $36_1$ is assigned a "0" bit since there is one "1" bit in the corresponding bit of the estimated data sequences $32_0$–$32_4$, and ⅕ is not greater than or equal to ½. The remainder of the averaged binary bits $36_2$–$36_N$ are assigned a "1" or "0" in a similar manner.

Figure 4:
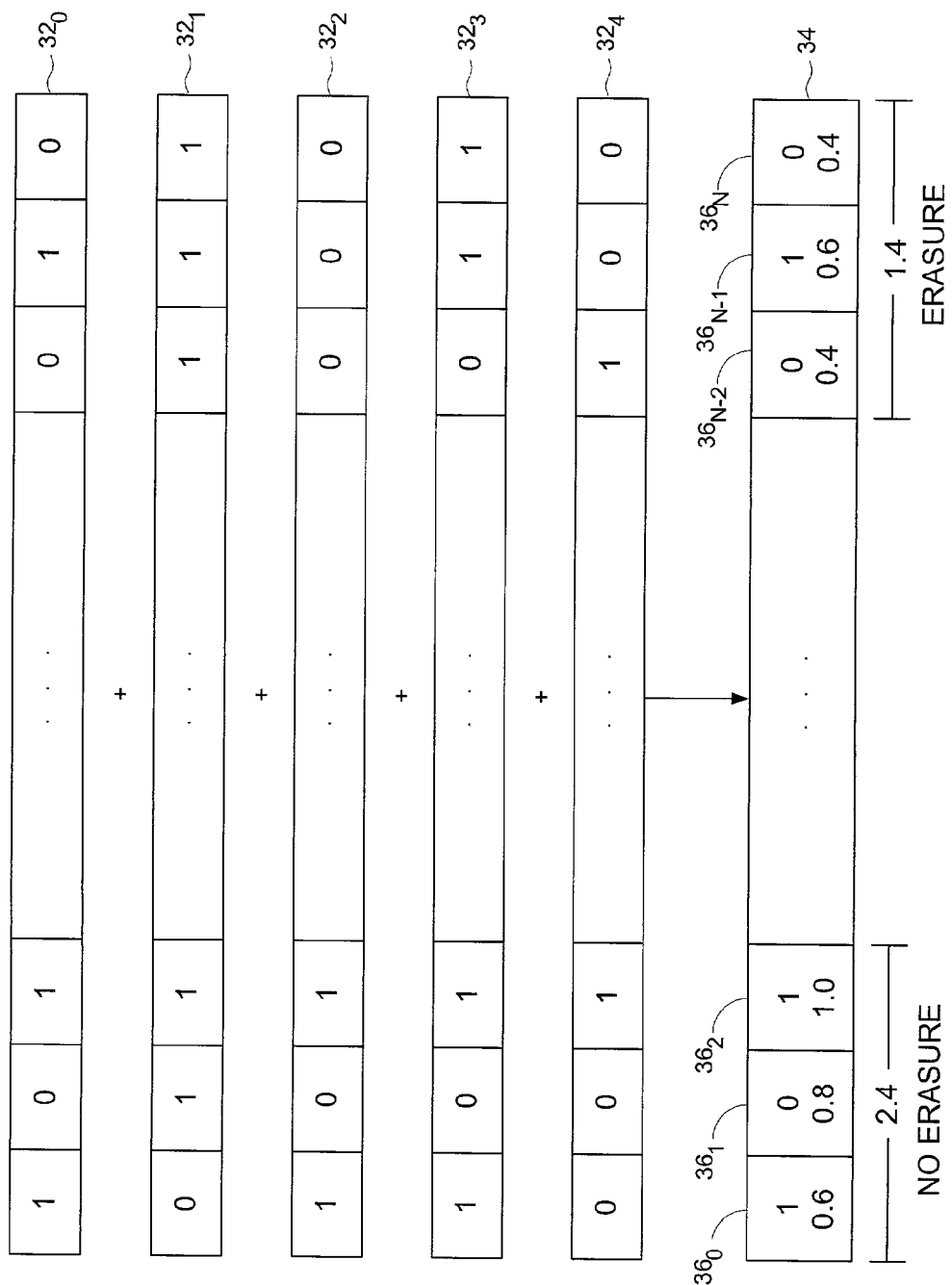
FIG. 4 shows an embodiment of the present invention wherein the bits of the averaged binary sequence are grouped into ECC symbols, and a reliability metric generated for each ECC symbol relative to the weighted outcome of the averaging.

In one embodiment, the averaged values used to assign the binary value to each averaged binary bit is also used to generate an erasure pointer for increasing the number of errors corrected by the error correction code 30. This is illustrated in FIG. 4 which shows a reliability metric generated for each bit in the estimated data sequence 34. The reliability metric in this embodiment is computed as the averaged value if assigned a "1" bit, and computed as one minus the average value if assigned a "0" bit. The first averaged binary bit $36_0$ is assigned a "1" bit so a reliability metric of ⅗ or 0.6 is assigned to the first averaged binary bit $36_0$. The second averaged binary bit $36_1$ is assigned a "0" bit so a reliability metric of 1-⅕ or 0.8 is assigned to the second averaged binary bit $36_1$. The remainder of the averaged binary bits $36_2$–$36_N$ are assigned a reliability metric in a similar manner. In the example of FIG. 4, the ECC symbols comprise three bits each, and the reliability metrics generated for each bit in a symbol are combined to generate the erasure pointers. In the example of FIG. 4, the reliability metrics are added and the result compared to a threshold. If the result is less than or equal to a threshold, then an erasure pointer is generated for the symbol. The combined metrics for the first symbol is 2.4 which is greater than 1.5 and therefore no erasure pointer is generated. The combined metrics for the last symbol is 1.4 which is less than 1.5 and therefore an erasure pointer is generated. Any suitable error correction code may be employed, such as a Reed-Solomon error correction code. Using erasure pointers to augment a an error correction code, such as a Reed-Solomon error correction code, is well known, the details of which are not disclosed so as not to obscure the embodiments of the present invention.

Figure 5:
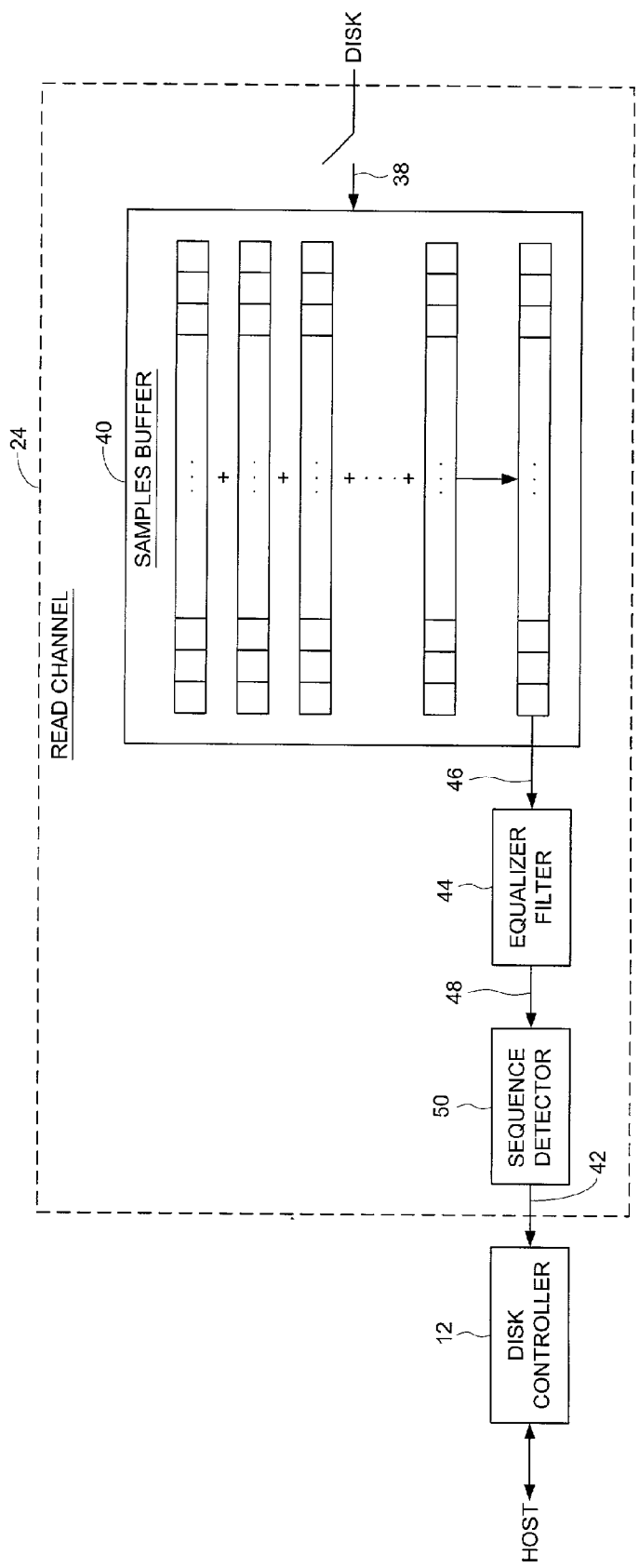
FIG. 5 shows an embodiment of the present invention wherein the averaged read data is generated by averaging read signal sample values generated over multiple retry operations, wherein the read channel processes the averaged read signal sample values to detect an estimated data sequence.

FIG. 5 shows an embodiment of the present invention wherein the averaged read data is generated by averaging read signal sample values 38 generated over multiple retry operations, wherein the read channel 24 processes the averaged read signal sample values stored in a samples buffer 40 to detect an estimated data sequence 42. In the embodiment shown in FIG. 4, the read channel 24 comprises an equalizer filter 44 for filtering the averaged read signal sample values 46 to generated equalized read signal sample values 48, and a sequence detector 50 for detecting the estimated data sequence 42 from the equalized read signal sample values 48. The read channel 24 may comprise other suitable circuitry, such as timing recovery and gain control circuitry not shown. The sequence detector 50 implements any suitable detection algorithm, such as a partial response maximum likelihood (PRML) algorithm. In one embodiment, the aspects of FIG. 2 and FIG. 5 are combined so that the averaged read data comprises averaged read signal sample values processed by the read channel 24 as well as averaged binary bits processed by the error correction code 30 of the disk controller 12.

Figure 6:
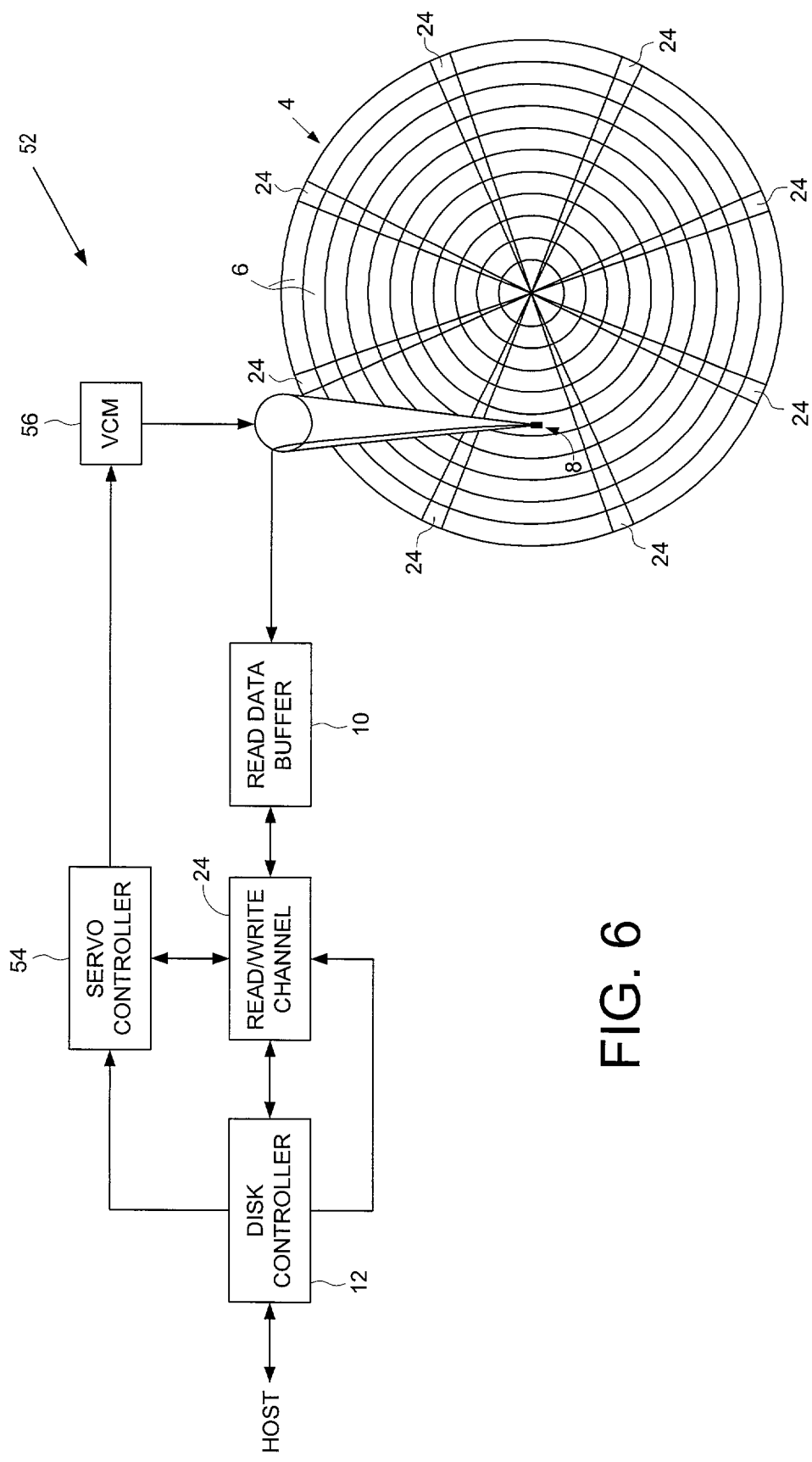
FIG. 6 shows a disk drive according to an embodiment of the present invention wherein the disk controller adjusts a parameter of the disk drive prior to rereading an errant data sector during a retry operation.

FIG. 6 shows a disk drive 52 according to an embodiment of the present invention wherein the disk controller 12 adjusts a parameter of the disk drive 52 prior to rereading an errant data sector during a retry operation. The disk controller 12 may adjust any suitable parameter, such as a parameter of the read channel 24 or a parameter of a servo controller 54. The servo controller 54 controls the operation of a voice coil motor (VCM) 56 for positioning the head 8 radially over the disk 4.

Figure 7:
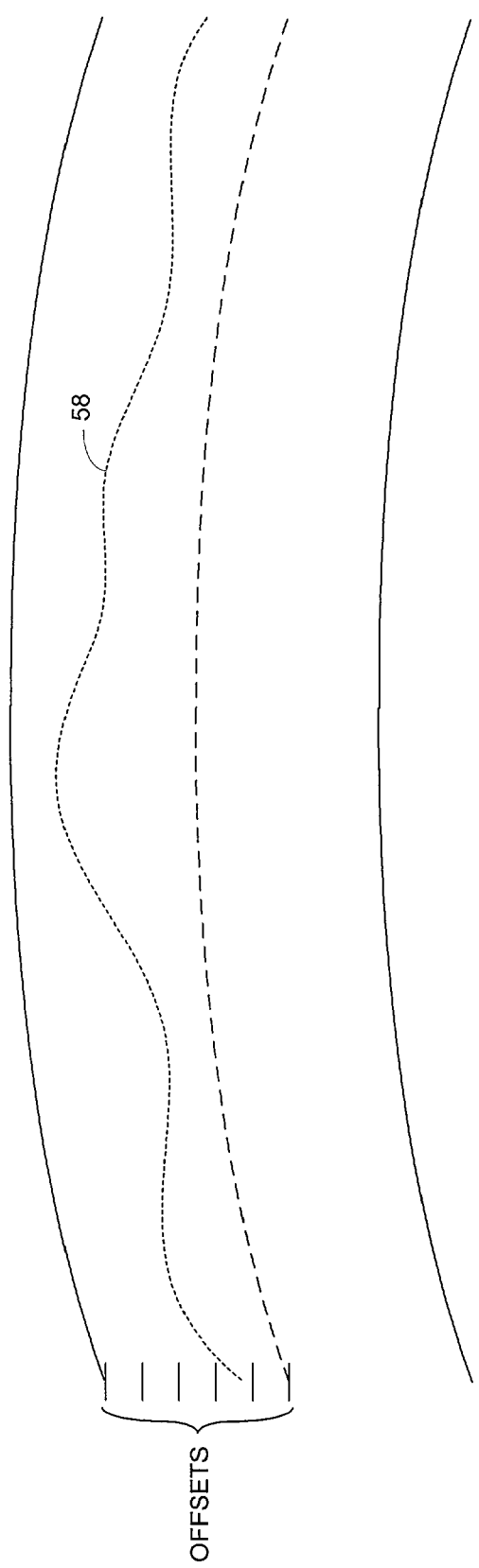
FIG. 7 illustrates a write error wherein data is written askew from the centerline of the track along a serpentine path and how reading the errant data sector with a single track offset may not recover the data sector.

In one embodiment illustrated in FIG. 7, the disk controller 12 adjusts a tracking offset setting during the retry operations so that the servo controller 54 maintains the head 8 offset from centerline of the track while reading a data sector. If the head 8 is offset from centerline during a retry operation, the data sector may be recovered without averaging the read data. However, as illustrated in FIG. 7, the data may be written along a serpentine path 58 such that reading the data sector with a single tracking offset setting will not recover the data sector. If the read data is averaged for several tracking offset settings it may enable recovery of the data sector. In one embodiment, several retry operations are performed for each tracking offset setting, thereby generating averaged read data for each tracking offset setting. The averaged read data for each tracking offset setting is averaged into a final set of averaged read data. In this manner, the read data along the path 58 of the data sector having a low signal-to-noise ratio (SNR) will average toward zero leaving the averaged read data with a high SNR as the dominant component in the final set of the averaged read data.

Figure 8:
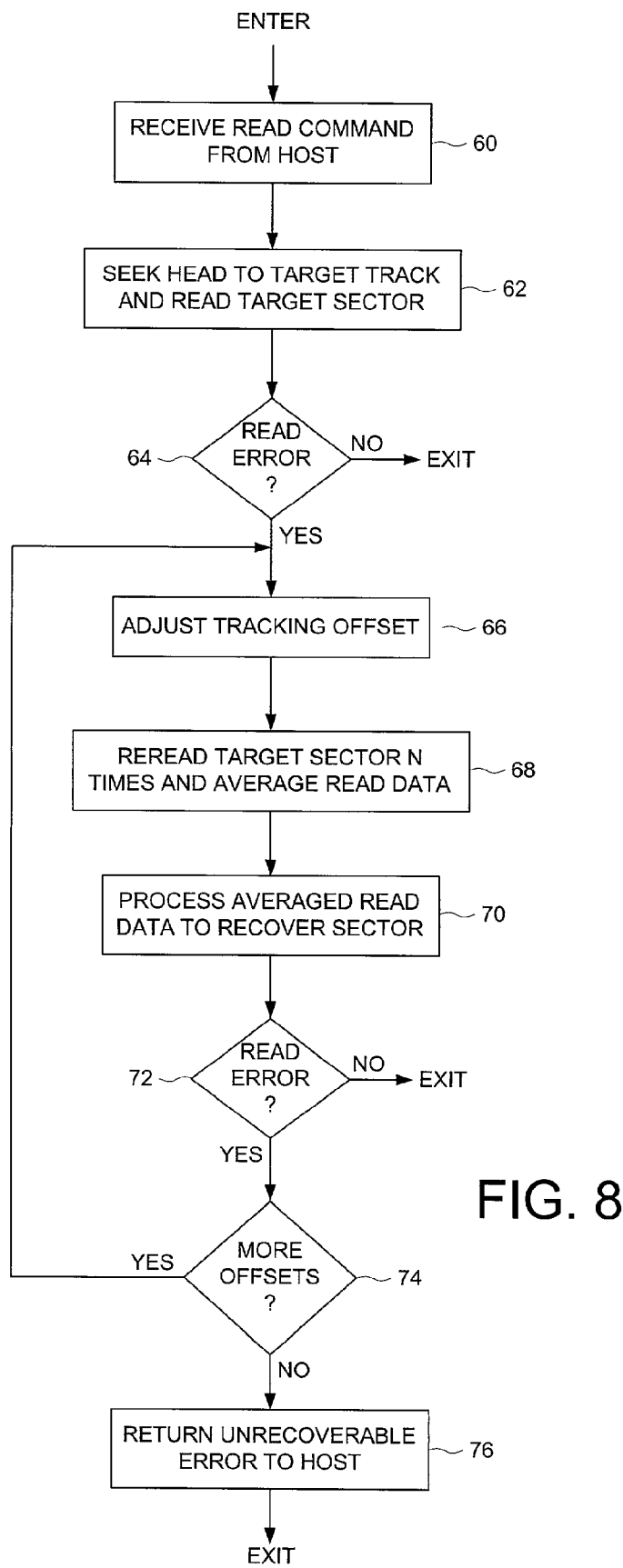
FIG. 8 is a flow diagram of an embodiment of the present invention wherein the disk controller adjusts a tracking offset to at least two settings, rereads an errant data sector multiple times for each tracking offset setting, and averages the resulting read data to generate the averaged read data.

FIG. 8 is a flow diagram illustrating the embodiment of the present invention wherein the disk controller 12 adjusts a tracking offset to at least two settings, rereads an errant data sector at least once for each tracking offset setting, and averages the resulting read data to generate the averaged read data. At step 60 the disk drive receives a command from a host to read a data sector. At step 62, the disk controller 12 seeks the head 8 to the target track and reads the target data sector. If at step 64 a read error occurs, then at step 66 the disk controller 12 adjusts a tracking offset setting. At step 68 the target sector is read N times and the resulting read data averaged. At step 70 the averaged read data is processed in an attempt to recover the data sector. If at step 72 the data sector is still unrecoverable, and at step 74 there are more tracking offset settings to try, then the process reiterates starting with step 66. In one embodiment, the target sector is read one time at step 68 and the tracking offset settings are cycled multiple times. In another embodiment, the target sector is read multiple times at step 68 over one cycle of the tracking offset settings. In yet another embodiment, the target sector is read multiple times at step 68 over multiple cycles of the tracking offset settings. If at step 74 all of the tracking offset settings have been tried, then at step 76 an unrecoverable error is returned to the host (or alternatively a different disk drive parameter is adjusted over a number of retry operations).

We claim:

1. A disk drive comprising:
   (a) a disk comprising a plurality of tracks, each track comprising a plurality of data sectors;
   (b) a head actuated radially over the disk, the head for generating a read signal while reading data from at least one of the data sectors;
   (c) a sampling device for sampling the read signal to generate read signal sample values;
   (d) a sequence detector for detecting an estimated data sequence from the read signal sample values;
   (e) a buffer;
   (f) a disk controller for processing a read command received from a host computer by:
   positioning the head over a selected data sector to generate a first read signal;
   sampling the first read signal to generate a first sequence of read signal sample values;
   detecting a first estimated data sequence using the sequence detector from the first sequence of read signal sample values;
   storing in the buffer the first estimated data sequence; if a read error occurs:
   repositioning the head over the selected data sector to generate a second read signal;
   sampling the second read signal to generate a second sequence of read signal sample values;
   detecting a second estimated data sequence using the sequence detector from the second sequence of read signal sample values;
   averaging the second estimated data sequence with the first estimated data sequence stored in the buffer to generate an averaged estimated data sequence;
   storing the averaged estimated data sequence in the buffer; and
   processing the averaged estimated data sequence stored in the buffer to recover the selected data sector.

2. The disk drive as recited in claim 1, wherein the disk controller implements an error correction code (ECC) for detecting and correcting errors in the averaged estimated data sequence.

3. The disk drive as recited in claim 2, wherein:
   (a) the averaged estimated data sequence comprises averaged binary bits;
   (b) the averaged binary bits are grouped into ECC symbols;
   (c) a reliability metric is generated for each ECC symbol in response to a reliability derived from averaging the binary bits; and
   (d) the disk controller processes the reliability metrics to augment the ECC.

4. The disk drive as recited in claim 3, wherein:
   (a) at least one erasure pointer is generated from the reliability metrics; and
   (b) the disk controller processes the erasure pointer to increase the number of correctable ECC symbols.

5. The disk drive as recited in claim 1, further comprising:
   an equalizer filter for filtering the read signal sample values to generate equalized read signal sample values, wherein the sequence detector detects the estimated data sequences from the equalized sample values.

6. The disk drive as recited in claim 1, wherein the disk controller adjusts at least one parameter of the disk drive prior to rereading the selected data sector.

7. The disk drive as recited in claim 6, wherein the disk controller adjusts a read channel parameter.

8. The disk drive as recited in claim 6, wherein the disk controller adjusts a servo control parameter.

9. The disk drive as recited in claim 8, wherein the disk controller adjusts a tracking offset to at least two different settings wherein for each tracking offset setting the disk controller performs at least one reread of the selected data sector to generate the averaged read data.

10. The disk drive as recited in claim 9, wherein for each tracking offset setting the disk controller performs multiple rereads of the selected data sector to generate the averaged read data.

11. A method of recovering an errant data sector in a disk drive, the disk drive comprising a disk having a plurality of tracks, each track comprising a plurality of data sectors, a head actuated radially over the disk, the head for generating a read signal while reading data from at least one of the data sectors, a sampling device for sampling the read signal to generate read signal sample values, a sequence detector for detecting an estimated data sequence from the read signal sample values, and a buffer, the method comprising the steps of:
(a) receiving a read command from a host computer;
(b) positioning the head over a selected data sector to generate a first read signal;
(c) sampling the first read signal to generate a first sequence of read signal sample values;
(d) detecting a first estimated data sequence using the sequence detector from the first sequence of read signal sample values;
(e) storing in the buffer the first estimated data sequence;
if a read error occurs:
(f) repositioning the head over the selected data sector to generate a second read signal;
(g) sampling the second read signal to generate a second sequence of read signal sample values;
(h) detecting a second estimated data sequence using the sequence detector from the second sequence of read signal sample values;
(i) averaging the second estimated data sequence with the first estimated data sequence stored in the buffer to generate an averaged estimated data sequence;
(j) storing the averaged estimated data sequence in the buffer; and
(k) processing the averaged estimated data sequence stored in the buffer to recover the selected data sector.

12. The method as recited in claim 11, wherein the step of processing the averaged estimated data sequence comprises the step of using an error correction code (ECC) for detecting and correcting errors in the averaged estimated data sequence.

13. The method as recited in claim 12, wherein the averaged estimated data sequence comprises averaged binary bits, and the step of using the ECC for detecting and correcting errors further comprising the steps of:
(a) grouping the averaged binary bits into ECC symbols;
(b) generating a reliability metric for each ECC symbol in response to a reliability derived from averaging the binary bits; and
(c) processing the reliability metrics to detect and correct errors in the averaged binary data.

14. The method ad recited in claim 13, further comprising the steps of:
(a) generating at least one erasure from the reliability metrics; and
(b) processing the erasure pointer to increase the number of correctable ECC symbols.

15. The method as recited in claim 11, further comprising the steps of
filtering the read signal sample values to generated equalized read signal sample values, wherein the sequence detector detects the estimated data sequences from the equalized sample values.

16. The method as recited in claim 11, further comprising the step of adjusting at least one parameter of the disk drive prior to rereading the selected data sector.

17. The method as recited in claim 16, wherein the step of adjusting a parameter of the disk drive comprises the step of adjusting a read channel parameter.

18. The method as recited in claim 16, wherein the step of adjusting a parameter of the disk drive comprises the step of adjusting a servo control parameter.

19. The method as recited in claim 18, further comprising the steps of adjusting a tracking offset to at least two different settings wherein for each tracking offset setting rereading the selected data sector at least once to generate the averaged read data.

20. The method as recited in claim 19, wherein for each tracking offset setting rereading the selected data sector multiple times to generate the averaged read data.

* * * * *

UNITED STATES PATENT AND TRADEMARK OFFICE
CERTIFICATE OF CORRECTION

PATENT NO. : 7,136,244 B1 Page 1 of 1
APPLICATION NO. : 10/080784
DATED : November 14, 2006
INVENTOR(S) : Michael S. Rothberg It is certified that error appears in the above-identified patent and that said Letters Patent is hereby corrected as shown below:

Col. 8, Line 16: After "method", delete "ad" and insert --as--.
(Claim 14, Line 1)

Col. 8, Line 23: After "the", delete "steps" and insert --step--.
(Claim 15, Line 2)

Signed and Sealed this

Third Day of June, 2008

JON W. DUDAS
*Director of the United States Patent and Trademark Office*